United States Patent
Wu et al.

(10) Patent No.: US 6,238,809 B1
(45) Date of Patent: May 29, 2001

(54) MAGNETIC RECORDING MEDIUM CONTAINING A CR($TA_2O_5$) UNDERLAYER

(75) Inventors: Zhong Stella Wu, Fremont; Rajiv Y. Ranjan, San Jose, both of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/160,579

(22) Filed: Sep. 25, 1998

Related U.S. Application Data

(60) Provisional application No. 60/074,359, filed on Feb. 10, 1998.

(51) Int. Cl.[7] .................................................. G11B 5/66
(52) U.S. Cl. .................................. 428/634 TS; 428/336; 428/900
(58) Field of Search .............................. 428/634 TS, 900, 428/336

(56) References Cited

U.S. PATENT DOCUMENTS 5,989,673 * 11/1999 Xiong .................................. 428/65.3
5,993,956 * 11/1999 Lambeth ............................. 428/332

* cited by examiner

*Primary Examiner*—Leszek Kiliman
(74) *Attorney, Agent, or Firm*—McDermott, Will & Emery

(57) ABSTRACT

The Hr and SNR of a magnetic recording medium are increased and reduced recording signal modulation by employing an underlayer containing Cr or a Cr alloy with $Ta_2O_5$ dispersed therein. Embodiments include a composite underlayer comprising a first Cr or Cr alloy underlayer containing about 0.1 to about 10 at. % dispersed $Ta_2O_5$ and a second underlayer comprising Cr or a Cr alloy, e.g. CrV, thereon.

14 Claims, 4 Drawing Sheets

MAGNETIC RECORDING MEDIUM CONTAINING A CR(TA₂O₅) UNDERLAYER

RELATED APPLICATIONS

This application claims priority from Provisional Application Ser. No. 60/074,359, filed Feb. 10, 1998 entitled "A NEW DOUBLE UNDERLAYER DESIGN FOR GLASS SUBSTRATES OF LONGITUDINAL RECORDING MEDIA", the entire disclosure of which is hereby incorporated herein by reference.

This application contains subject matter similar to subject matter disclosed in copending U.S. patent applications Ser. No. 09/159,629 filed on Sep. 24, 1998, now pending and Ser. No. 09/160,580 filed on Sep. 25, 1998, now U.S. Pat. No. 6,139,950.

TECHNICAL FIELD

The present invention relates to magnetic recording media, such as thin film magnetic recording disks. The present invention has particular applicability to high areal density magnetic recording media exhibiting low noise, high remanent coercivity and reduced signal modulation.

BACKGROUND ART

The requirement for increasingly high areal recording density imposes increasingly greater demands on thin film magnetic recording media in terms of remanent coercivity (Hr), magnetic remanance (Mr), coercivity squareness (S*), medium noise, i.e., signal-to-noise ratio (SNR), and narrow track recording performance. Efforts to produce a magnetic recording medium satisfying such demanding requirements confront significant challenges.

The linear recording density can be increased by increasing the coercivity of the magnetic recording medium. However, this objective can only be accomplished by decreasing the medium noise, as by maintaining very fine magnetically non-coupled grains. Medium noise is a dominant factor restricting increased recording density of high density magnetic hard disk drives. Medium noise in thin films is attributed primarily to inhomogeneous grain size and intergranular exchange coupling. Accordingly, in order to increase linear density, medium noise must be minimized by suitable microstructure control.

A conventional longitudinal recording disk medium is depicted in FIG. 1 and comprises a substrate 10, typically an aluminum (Al) -alloy, such as an Al-magnesium. (AlMg) alloy, plated with a layer of amorphous nickel-phosphorus (NiP). Alternative substrates include glass, ceramic and glass-ceramic materials, plastics, silicon, as well as graphite. There are typically sequentially sputter deposited on each side of substrate 10 an adhesion enhancement layer 11, 11', e.g., chromium (Cr) or a Cr alloy, a seedlayer 12, 12', such as NiP, an underlayer 13, 13', such as Cr or a Cr alloy, a magnetic layer 14, 14', such as a cobalt (Co)-based alloy, and a protective overcoat 15, 15', such as a carbon-containing overcoat. Typically, although not shown for illustrative convenience, a lubricant topcoat is applied on the protective overcoat 15, 15'.

It is recognized that the magnetic properties, such as Hr, Mr, S* and SNR, which are critical to the performance of a magnetic alloy film, depend primarily upon the microstructure of the magnetic layer which, in turn, is influenced by the underlying layers, such as the underlayer. It is recognized that underlayers having a fine grain structure are highly desirable, particular for epitaxially growing fine grains of hexagonal close packed (HCP) Co alloys deposited thereon.

As the demand for high areal recording density increases, the requirements for high recording signal, low media noise and narrow transitions become increasingly difficult to simultaneously satisfy, thereby imposing great demands on film structure design and fabrication techniques. Thus, efforts have been made to explore new types of magnetic materials, explore new underlayer materials, design new multi-layer thin film structures and manipulate various thin film deposition parameters in attempting to improve magnetic properties and information read/write processes. However, there remains a need for increasingly high areal recording density magnetic recording media exhibiting a Hr, high SNR, and reduced recording signal modulation.

DISCLOSURE OF THE INVENTION

An advantage of the present invention is a high areal recording density magnetic recording medium exhibiting low noise, high Hr and reduced recording signal modulation.

Additional advantages and other features of the present invention will be set forth in part in the description which follows and in part will become apparent to those having ordinary skill in the art upon examination of the following only to be learned from the practice of the present invention. The advantages of the present invention may be realized and obtained as particularly pointed out in the appended claims.

According to the present invention, the foregoing and other advantages are achieved by a magnetic recording medium comprising: a non-magnetic substrate; a first underlayer comprising chromium (Cr) or a Cr alloy, containing tantalum oxide ($Ta_2O_5$) dispersed therein; a second underlayer containing Cr or a Cr alloy; and a magnetic layer.

Another aspect of the present invention is a magnetic recording medium comprising: a glass, ceramic or glass-ceramic substrate, a first underlayer on the substrate, the first underlayer comprising Cr or a Cr alloy containing $Ta_2O_5$ dispersed therein; a second underlayer on the first underlayer, the second underlayer containing Cr or a Cr alloy; and a magnetic layer on the first underlayer.

Additional advantages of the present invention will become readily apparent to those skilled in this art from the following detailed description, wherein only the preferred embodiment of the present invention is shown and described, simply by way of illustration of the best mode contemplated for carrying out the present invention. As will be realized, the present invention is capable of other and different embodiments, and its details are capable of modifications in various obvious respects, all without departing from the present invention. Accordingly, the drawings and description are to be regarded as illustrative in nature, and not as restrictive.

DESCRIPTION OF THE INVENTION

Figure 1:
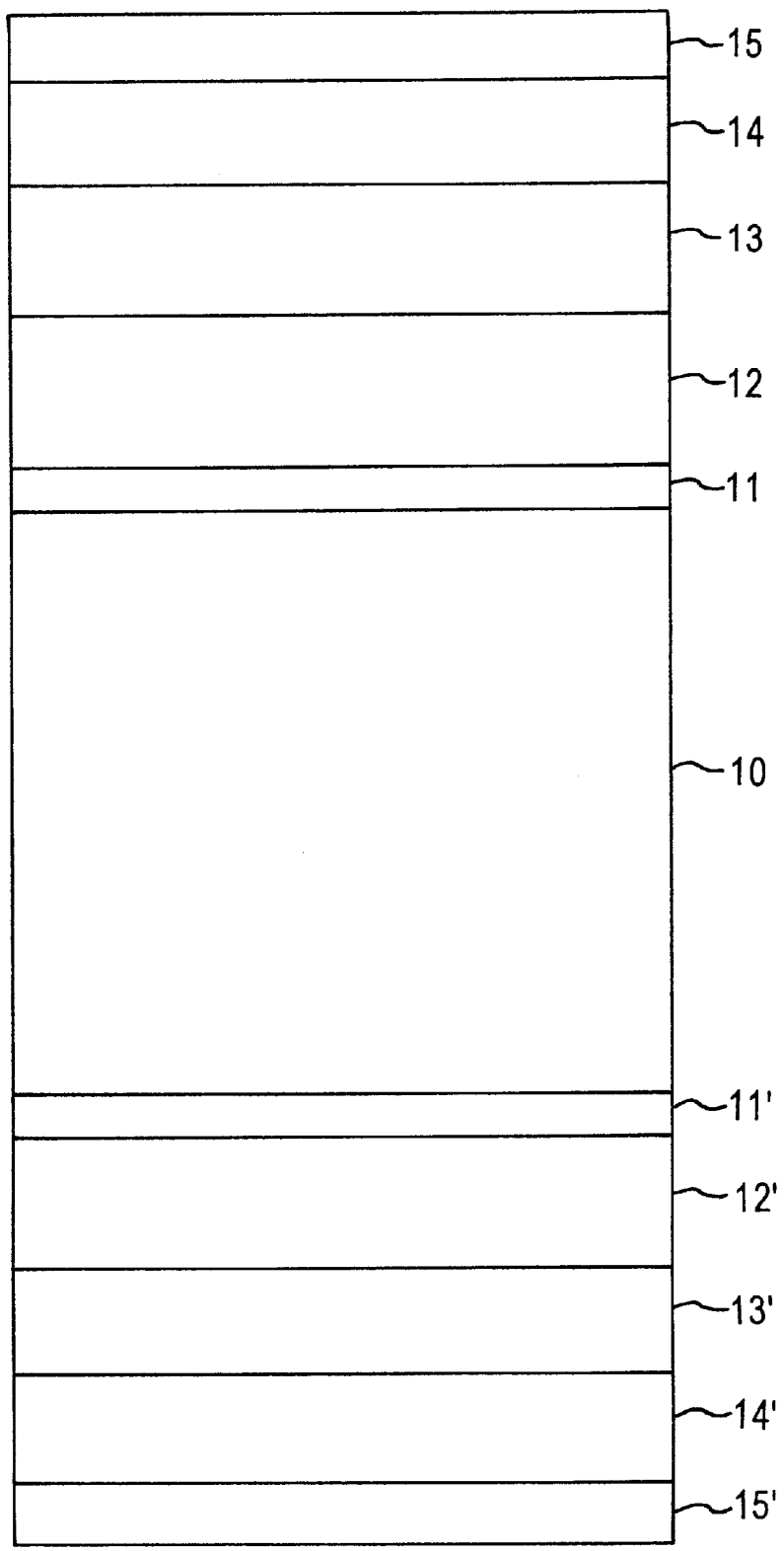
FIG. 1 schematically illustrates a conventional magnetic recording medium structure.

The present invention provides magnetic recording media suitable for high areal recording density exhibiting high Hr, high SNR and reduced recording signal modulation. In embodiments of the present invention, the objectives of high areal recording density, high Hr, high SNR and reduced recording signal modulation are achieved by the strategic formation of an underlayer comprising Cr or a Cr alloy containing tantalum oxide ($Ta_2O_5$) dispersed within the Cr or Cr alloy, particularly at the grain boundaries.

Embodiments of the present invention comprise sputter depositing, as by RF or DC magnetron sputtering, the first underlayer from a target containing Cr or a Cr alloy layer having $Ta_2O_5$ dispersed therein at the grain boundaries and fabricated by hot isostatic compaction. Such sputtering targets typically comprise highly homogeneous grains having a fine grain size. Particularly advantageous results have been achieved employing a double underlayer structure comprising a first underlayer of Cr or a Cr alloy having $Ta_2O_5$ dispersed therein, and a second underlayer comprising Cr or a Cr alloy layer on the first underlayer. The first underlayer can comprise $Ta_2O_5$ in an amount of about 0.1 to about 10 at. %. The Cr alloys employed for the first and/or second underlayers can comprise Cr and an alloy element such as vanadium (V), manganese (Mn), molybdenum (Mo), titanium (Ti), zirconia (Zr) or copper (Cu) typically in an amount of about 0.1 to about 50 at. %.

The present invention can be implemented employing a non-magnetic substrate, such as any of the non-magnetic substrates conventionally employed in the manufacture of magnetic recording media, e.g. Al, Al alloys such as AlMg, NiP plated Al or Al alloys, or alternative substrates, such as glass, glass-ceramic and ceramic materials. Particularly advantageous results have been achieved employing glass substrates.

Magnetic recording media in accordance with the present invention can comprise a magnetic layer containing any magnetic material conventionally employed in the manufacture of magnetic recording media, such as a Co alloy, e.g. Co-Cr-tantalum (Ta) alloys, Co-Cr-platinum (Pt) alloys, CoCrNi alloys, or CoCrPtTa alloys.

In various embodiments of the present invention, the first underlayer can be deposited at a thickness of about 10 Å to about 1000 Å, e.g. about 200 Å to about 600 Å. Advantageously, the first and second underlayers can be deposited at the same thickness, typically about 10 Å to about 1000 Å, e.g. about 200 Å to about 600 Å.

The use of an underlayer structure, particularly double underlayer structure containing a first underlayer of Cr or a Cr alloy layer having $Ta_2O_5$ dispersed therein, particularly at the grain boundaries, and a second underlayer of Cr or a Cr alloy layer, particularly a Cr alloy such as $CrV_{20}$, yields particularly advantageously high Hr, low medium noise and reduced recording signal modulation. Advantageously, conventional manufacturing techniques and production equipment can be employed to produce magnetic recording media in accordance with the present invention. For example, the underlayer can be sputter deposited on a smooth glass substrate in a DC magnetron sputtering apparatus while maintaining the base pressure below $10^{-7}$ Torr., heating the substrate at a temperature in excess of 100° C. and maintaining the sputtering pressure at about 5 to about 15 mTorr. Magnetic layers can be epitaxially grown on the second underlayer.

Figure 2:
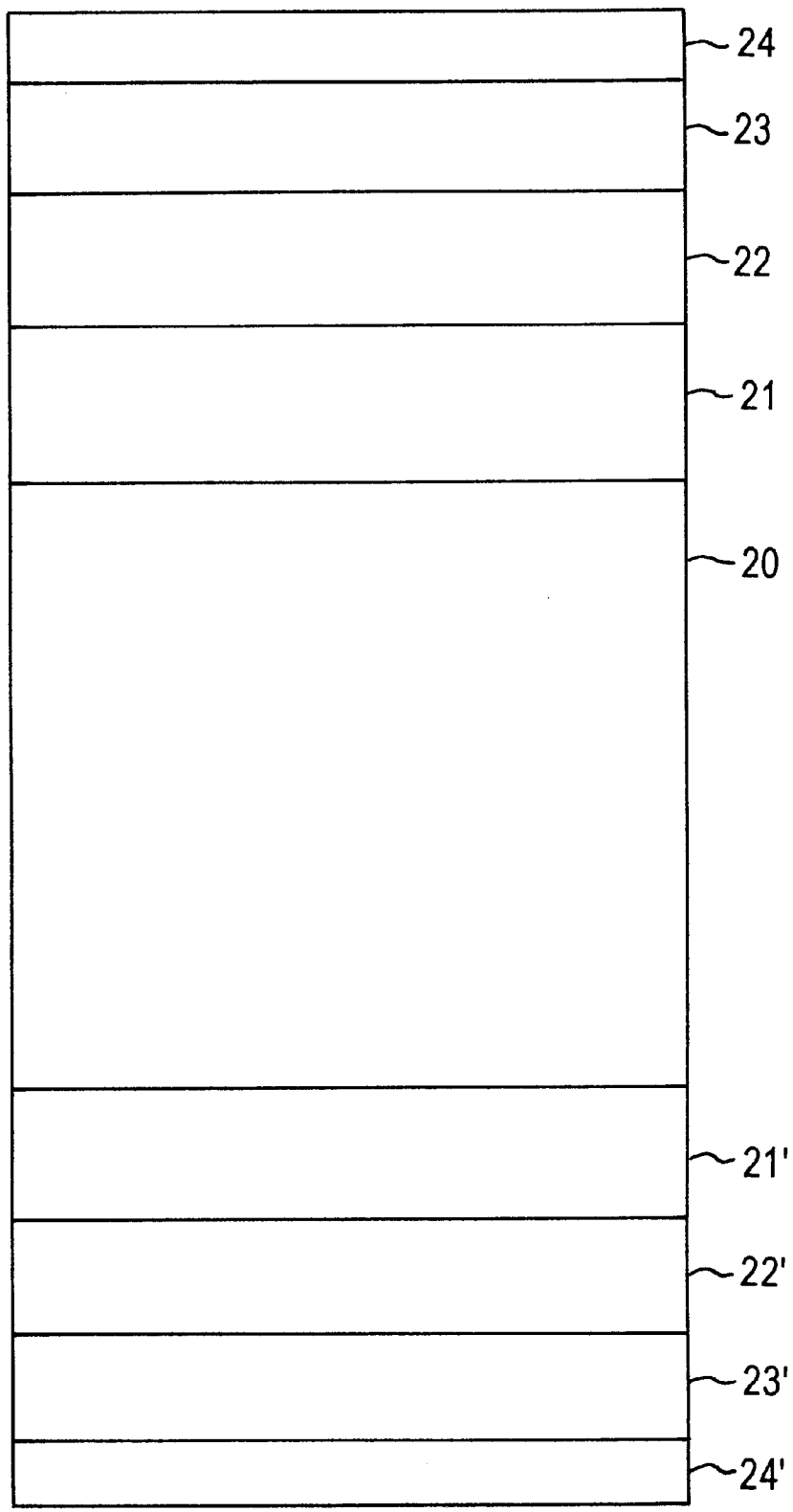
FIG. 2 schematically depicts a magnetic recording medium structure in accordance with an embodiment of the present invention.

An embodiment of the present invention is schematically illustrated in FIG. 2 and comprises substrate 20, such as a glass, ceramic or glass-ceramic material. There are sequentially sputter deposited on each side of substrate 20 first underlayer 21, 21' comprising Cr or a Cr alloy having $Ta_2O_5$ dispersed therein, second underlayer 22, 22' comprising Cr or a Cr alloy, e.g. $CrV_{20}$, a magnetic alloy layer 23, 23', and a protective overcoat 24, 24' such as a carbon-containing protective overcoat. Although not shown for illustrative convenience, a lubricant topcoat is applied on the protective overcoat 14, 14'.

EXAMPLES

Four recording media were prepared and tested on a non-destructive rotating disk magnetometer. The recording signal and media noise were measured at 240 kfci (kiloflux reversal per cubic inch) linear density employing a Guzik tester with a MR (magnetoresistive) head having a gap length of about 0.5 $\mu$m flying at a height of about 1.1 micro inches ($\mu$inch).

The four magnetic recording media prepared are set forth in Table I below, wherein Samples A1 and B1 represent embodiments of the present invention, while Samples A2 and B2 represent conventional magnetic recording media.

TABLE I

| Sample # | film structure | film thickness |
| --- | --- | --- |
| A1 | $Cr(Ta_2O_5)_2/CrV_{20}/CoCrPtTa(1)$ / C | 600 Å/600 Å/210 Å/100 Å |
| A2 | $CrV_{20}/CoCrPtTa(1)$ /C | 600 Å/210 Å/100 Å |
| B1 | $Cr(Ta_2O_5)_2/CrV_{20}/CoCrPtTa(2)$ / C | 600 Å/600 Å/240 Å/100 Å |
| B2 | $CrV_{20}/CoCrPtTa(2)$ /C | 600 Å/240 Å/100 Å |

Samples A1 and B1 of the present invention were formed with a double underlayer structure comprising a first underlayer of Cr with $Ta_2O_5$ dispersed therein [$Cr(Ta_2O_5)_2$] and a second underlayer containing $CrV_{20}$ on the first underlayer. Samples A1 and A2 were formed with a CoCrPtTa(1) magnetic alloy, while Samples B1 and B2 were formed with another CoCrPtTa(2) magnetic alloy which differed from the magnetic alloy employed for Samples A1 and A2 by 2 at. % of Cr and 3 at. % of Pt content. Apart from the difference in underlayer structure and magnetic alloy as set forth above, all samples, i.e., Samples A1, A2, B1 and B2, comprised substantially the same glass substrate and were prepared under substantially the same deposition techniques.

Figure 3A:
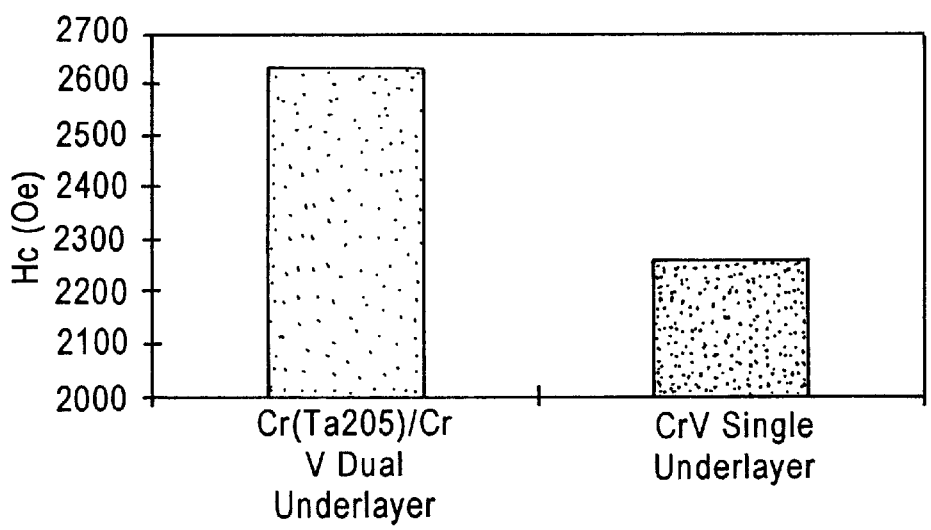
FIGS. 3A, 3B and 3C illustrate the Hr, SNR and recording signal modulation, respectively, for an embodiment of the present invention vis-à-vis a conventional magnetic recording medium.
Figure 3B:
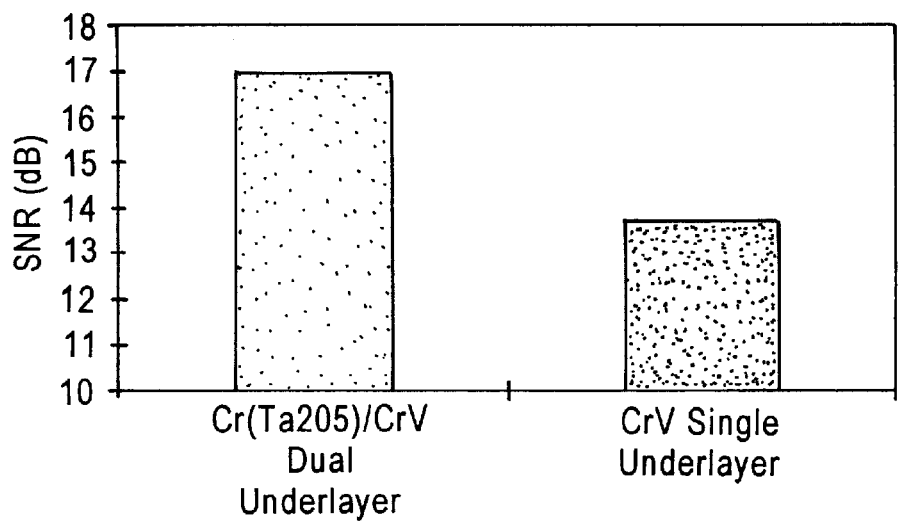
Figure 3C:
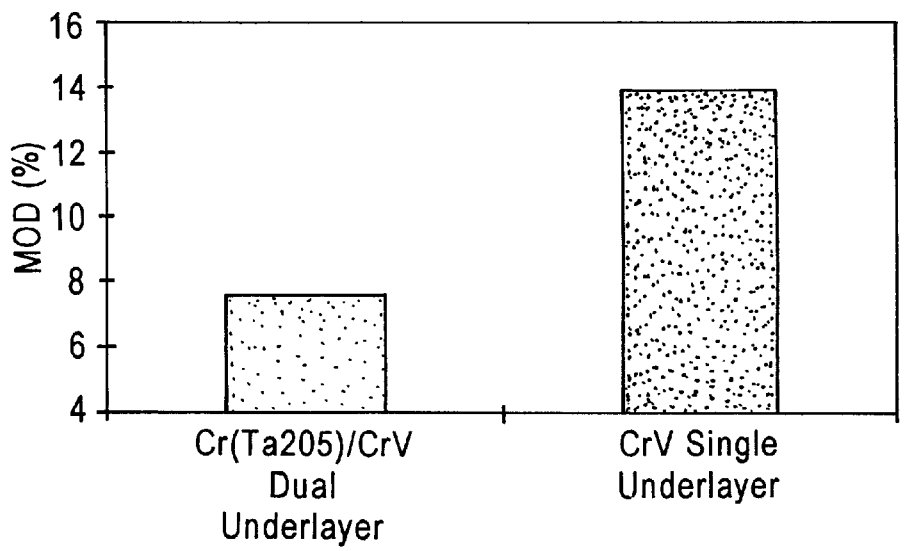

The results of non-destructively testing Samples A1 and A2 are shown in FIGS. 3A, 3B and 3C and demonstrate that the magnetic recording medium of the present invention exhibits increased Hr and SNR, and reduced recording signal modulation, respectively, vis-à-vis the conventional magnetic recording medium. It is apparent that the use of a double underlayer structure in accordance with the present invention resulted in an increase in Hr of 380 Oe, an increase in SNR of 3 dB and a strong decrease in recording signal modulation vis-à-vis the corresponding magnetic recording medium having a single underlayer structure without the underlayer of Cr with dispersed $(Ta_2O_5)_2$.

Figure 4A:
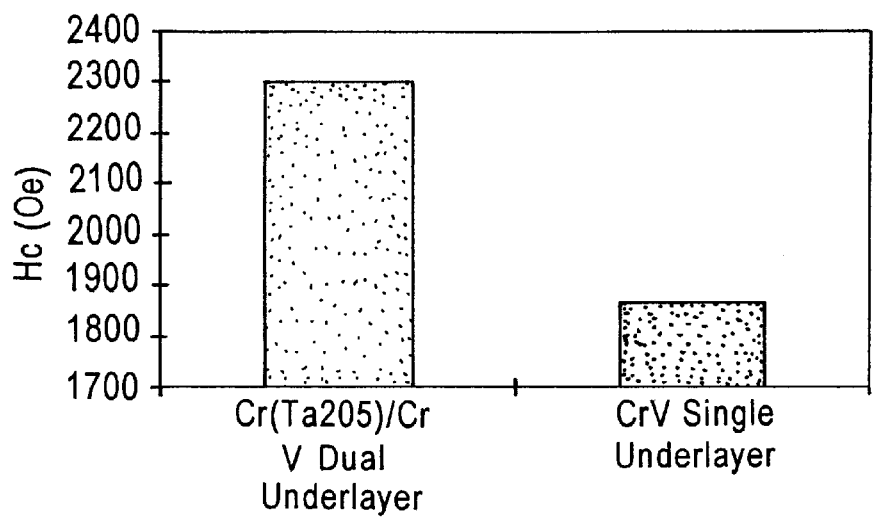
FIGS. 4A, 4B and 4C illustrate the Hr, SNR and recording signal modulation, respectively, for another embodiment of the present invention vis-à-vis a conventional magnetic recording medium.
Figure 4B:
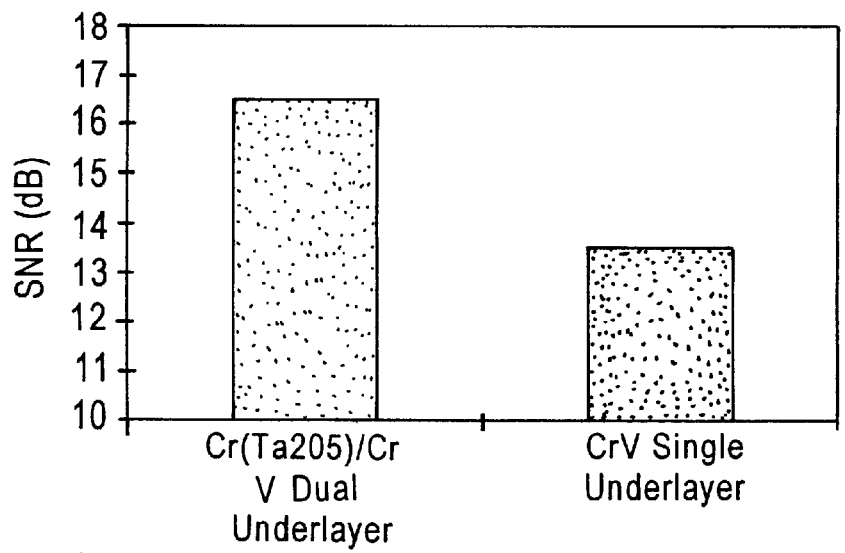
Figure 4C:
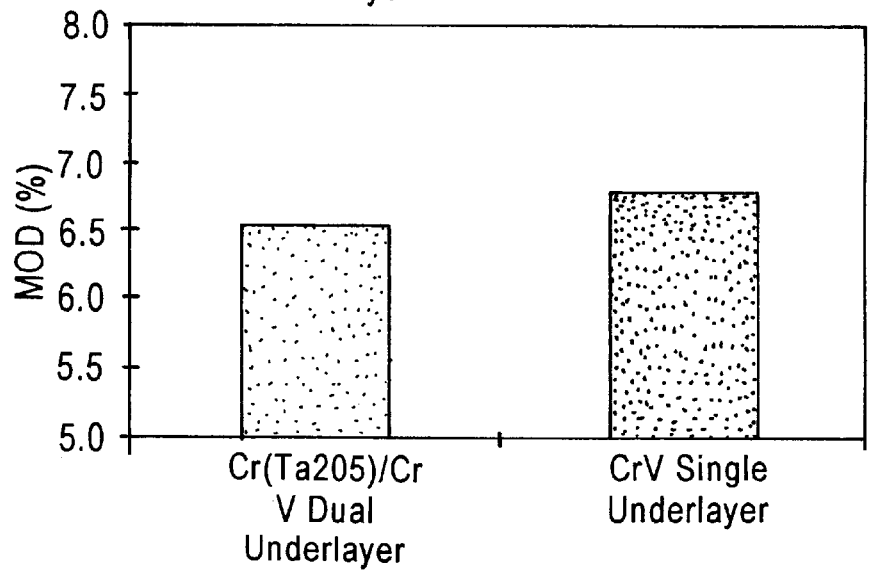

The results of non-destructively testing Samples B1 and B2 are reported in FIGS. 4A, 4B and 4C and demonstrate similar superior Hr and SNR, and reduced recording signal modulations, respectively. It is apparent that the magnetic recording medium in accordance with the present invention containing a first underlayer comprising Cr with dispersed $TaO_5$ exhibited an increase of 430 Oe in Hr, an increase of 3 dB in SNR and a decrease in recording signal modulation vis-à-vis the conventional magnetic recording medium without the first underlayer comprising Cr with dispersed $Ta_2O_5$.

The present invention provides a magnetic underlayer structure comprising a first underlayer containing Cr or a Cr alloy with $Ta_2O_5$ dispersed therein, thereby achieving a significantly higher Hr which, in turn, results in a shorter data bit length and magnetic transitional length. Magnetic recording media in accordance with the present invention also exhibit significantly reduced media noise and reduced recording signal modulation, thereby ensuring high quality reading/writing pulses and high storage density capability. The exact mechanism underpinning the improvement in magnetic properties achieved by employing an underlayer containing Cr or a Cr alloy with $Ta_2O_5$ dispersed therein is not known with certainty. However, it is believed that the improvement can be attributed to several possible mechanisms, such as decreased grain size of underlayer material by virtue of the dispersed $Ta_2O_5$ therein, particularly at the grain boundaries. By reducing the grain size of the underlayer, the grain size of the magnetic film epitaxially grown thereon is reduced, thereby providing stronger segregation at grain boundaries and, hence, reduced magnetic exchange and magnetostatic interactions, superior lattice matching and, hence, better epitaxial growth and a higher degree of crystallinity and magnetic easy axis orientation.

The present invention can be employed to produce any of various types of magnetic recording media, including thin film disks. The present invention is particularly applicable in producing a high areal recording density magnetic recording media requiring a low flying height and exhibiting high Hr, high SNR and reduced recording signal modulation.

Only the preferred embodiment of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. A magnetic recording medium comprising:
 a non-magnetic substrate;
 a first underlayer comprising chromium (Cr) or a Cr alloy, containing tantalum oxide ($Ta_2O_5$) dispersed therein;
 a second underlayer comprising Cr or a Cr alloy; and a magnetic layer;
 wherein the $Ta_2O_5$ is dispersed primarily at grain boundaries of the Cr or Cr alloy.

2. The magnetic recording medium according to claim 1, wherein the first Cr or Cr alloy underlayer contains about 0.1 to about 10 at. % $Ta_2O_5$.

3. The magnetic recording medium according to claim 2, further comprising a second underlayer on the first underlayer, and the magnetic layer on the second underlayer.

4. The magnetic recording medium according to claim 3, wherein the second underlayer comprises Cr or a Cr alloy.

5. The magnetic recording medium according to claim 4, wherein the Cr alloy of the first underlayer and/or the second underlayer comprises about 0.1 to about 50 at. % vanadium, manganese, molybdenum, titanium, zirconium or copper.

6. The magnetic recording medium according to claim 3, wherein the second underlayer comprises an alloy of Cr and vanadium.

7. The magnetic recording medium according to claim 1, wherein the magnetic layer comprises a cobalt alloy.

8. The magnetic recording medium according to claim 1, wherein the target material for producing the first underlayer layer is produced by hot isostatic compaction.

9. The magnetic recording medium according to claim 1, wherein the first underlayer has a thickness of about 10 Å to about 1000 Å.

10. The magnetic recording medium according to claim 9, wherein the first underlayer has a thickness of about 200 Å to about 600 Å.

11. The magnetic recording medium according to claim 3, wherein each of the first and second underlayers has a thickness of about 10 Å to about 1000 Å.

12. The magnetic recording medium according to claim 11, wherein each of the first and second underlayers has a thickness of about 200 Å to about 600 Å.

13. The magnetic recording medium according to claim 1, wherein the non-magnetic substrate comprises a glass, ceramic or glass-ceramic material.

14. The magnetic recording medium according to claim 13, wherein the non-magnetic substrate comprises a glass material.

* * * * *